(12) United States Patent
Huntemann

(10) Patent No.: US 6,955,778 B2
(45) Date of Patent: Oct. 18, 2005

(54) METHOD FOR PRODUCING SYNTACTIC POLYURETHANE

(75) Inventor: Peter Huntemann, Stemshorn (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 32 days.

(21) Appl. No.: 10/480,230

(22) PCT Filed: Jun. 6, 2002

(86) PCT No.: PCT/EP02/06195
§ 371 (c)(1), (2), (4) Date: Dec. 10, 2003

(87) PCT Pub. No.: WO02/102887
PCT Pub. Date: Dec. 27, 2002

(65) Prior Publication Data
US 2004/0173938 A1 Sep. 9, 2004

(30) Foreign Application Priority Data
Jun. 12, 2001 (DE) .......................... 101 29 232

(51) Int. Cl.[7] .......................... B29C 35/04; B29C 70/66
(52) U.S. Cl. .......................... 264/45.3; 264/54; 264/240; 264/260
(58) Field of Search .......................... 264/45.1, 45.3, 264/54, 240, 260, DIG. 6, DIG. 13, 241; 425/4 R, 4 C, 200

(56) References Cited
U.S. PATENT DOCUMENTS 4,122,047 A * 10/1978 Filip et al. .................. 521/106
4,425,449 A * 1/1984 Dorsey ........................ 523/218
4,468,363 A * 8/1984 Miessler ..................... 264/128
4,644,014 A * 2/1987 Thomson et al. ............. 521/68
5,164,197 A * 11/1992 Thary .......................... 425/4 R
5,826,978 A   10/1998 Zikeli et al.
6,387,447 B1   5/2002 Grimm et al.
6,541,534 B2 * 4/2003 Allen et al. ................. 521/174

FOREIGN PATENT DOCUMENTS

| DE | 199 12 988 | 3/1999 |
|----|------------|--------|
| EP | 290 147    | 10/1990 |
| EP | 896 976    | 2/1999 |
| FR | 2 755 139  | 4/1998 |
| WO | 87/01070   | 2/1987 |
| WO | 96/05338   | 2/1996 |
| WO | 99/03922   | 1/1999 |

\* cited by examiner

*Primary Examiner*—Angela Ortiz
(74) *Attorney, Agent, or Firm*—Novak Druce & Quigg

(57) ABSTRACT

Syntactic polyurethanes are prepared by mixing hollow microspheres with polyurethanes by a process in which, in a first step, the polyurethane system components are reacted and, in a second step, the feeding of the hollow microspheres is effected in a mixing apparatus, the mixing apparatus being free of dead space and comprising
i) a mixing pot,
ii) a feed for polyurethane,
iii) a feed for hollow microspheres,
iv) a stirring element and
v) an outlet orifice.

6 Claims, 1 Drawing Sheet

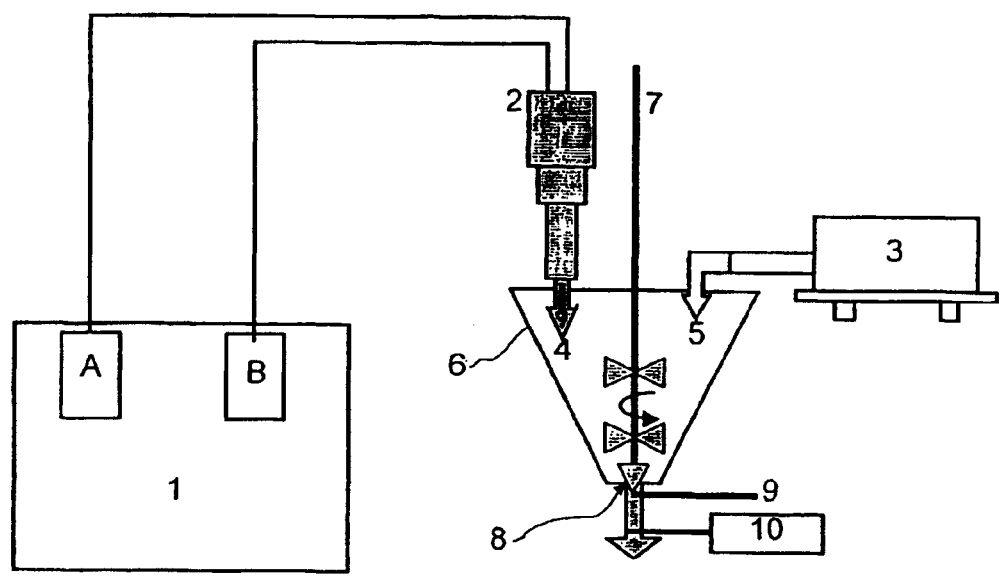

METHOD FOR PRODUCING SYNTACTIC POLYURETHANE

The present invention relates to a process for the preparation of syntactic polyurethane by mixing hollow microspheres with polyurethanes, wherein, in a first step, the polyurethane system components are reacted and, in a second step, the feeding of the hollow microspheres is effected in a continuously operating mixing apparatus.

The term syntactic plastics covers in general plastics which contain hollow fillers. Syntactic plastics are usually used as insulating coatings, owing to their advantageous compressive strength and thermal resistance preferably in the offshore sector. Applications as fireproof material and as sound insulation materials are likewise known.

WO 87/1070 describes a heat insulation material consisting of elastomeric plastic, for example rubber or styrene/butadiene, as a matrix and hollow glass microspheres, the latter being incorporated in an amount of 40–80% by volume.

WO 99/3922 and EP-A-896 976 describe syntactic polyurethanes which consist of polyurethane and hollow glass microspheres and are preferably used as an insulating coating for pipes in the offshore sector. The production is effected by adding hollow microspheres to one of the polyurethane system components and then mixing the system components.

DE-A-199 12 988 describes the preparation of polyurethane foams containing hollow glass microspheres and the use of said foams as fireproof foams. Here too, the hollow microspheres are added to one of the system components and these are then mixed, for example by means of a static mixer.

In order to obtain good insulation properties of a foam system, it is advantageous to incorporate as many hollow microspheres as possible into the system. What is problematic is that high filler contents lead to system components which have high viscosities, are frequently thixotropic and under certain circumstances are not pumpable and hence also poorly miscible. This problem is increased by the fact that, in the field of use of the polyurethanes, the total filler content usually has to be added to the polyol component since the hollow glass spheres are generally not compatible with the isocyanate because, owing to the water content and/or the alkali content at the surface of glass, the quality of the isocyanate is impaired.

The processing of the filler-containing polyol component is often expensive since, as a rule, special, sensitive screw pumps are required in order to transport the filler-containing components, since conventional gear pumps would destroy the hollow microspheres. A further problem is associated with the mixing of the very highly viscous components. Here, mixing by means of high pressure mixing chambers is not possible since the hollow spheres would be destroyed. Mixing by means of low pressure mixing chambers is difficult since very high stirring speeds and complicated stirrer geometries are required. Here too, some of the spheres are destroyed owing to high shear forces occurring. A further disadvantage encountered when the fillers are added to the polyol component before the urethane reaction is that the hollow microspheres so to speak spatially impede the isocyanate/polyol reaction and hence unsatisfactory results may be obtained.

It is an object of the present invention to provide a process which makes it possible to mix the hollow microspheres advantageously with the polyurethane. Here, it is important that even sensitive hollow microspheres, such as hollow glass microspheres, can be incorporated on the one hand in very high concentrations but on the other hand with very small losses due to breakage. Furthermore, the incorporation rate should be high in combination with very low losses due to breakage. Moreover, the process should be capable of being realized with little technical complexity.

We have found that this object is achieved by a process wherein first the polyurethane system components are reacted with one another and then the hollow microspheres are admixed in a continuous suitable mixing apparatus.

The present invention therefore relates to a process for the preparation of syntactic polyurethanes by mixing hollow microspheres with polyurethanes preparable by reacting
a) polyisocyanates with
b) compounds which have at least two hydrogen atoms reactive toward isocyanate, in the presence or absence of
c) catalysts,
d) blowing agents and
e) additives, wherein, in a first step, the components a) and b) and, if required, c) to d) are reacted and, in a second step, the feeding of the hollow microspheres is effected in a preferably continuously operating mixing apparatus, the mixing apparatus being free of dead space and comprising
i) a mixing pot,
ii) a feed for polyurethane,
iii) a feed for hollow microspheres,
iv) a stirring element and
v) an outlet orifice.

The present invention furthermore relates to the use of a preferably continuously operating mixing apparatus, comprising
i) a mixing pot,
ii) a feed line for polyurethane,
iii) a feed line for hollow microspheres,
iv) a stirring element and
v) a regulatable outlet orifice, for the preparation of polyurethane containing hollow microspheres.

In the context of this invention, the term hollow microspheres is to be understood as meaning organic and inorganic hollow spheres. Organic hollow spheres which may be used are, for example, hollow plastics spheres, for example of polyethylene, polypropylene, polyurethane, polystyrene or a mixture thereof. The mineral hollow spheres may contain, for example, clay, aluminum silicate, glass or mixtures thereof. Usually, the organic or-mineral hollow spheres have a diameter of from 1 to 1 000 μm, preferably from 5 to 200 μm.

The hollow spheres may have a vacuum or partial vacuum in the interior or may be filled with air, inert gases, for example nitrogen, helium or argon, or reactive gases, for example oxygen.

The hollow microspheres used are preferably hollow glass microspheres. In a particularly preferred embodiment, the hollow glass microspheres have a compressive strength of at least 50 bar. For example, 3M—Scotchlite® Glass Bubbles may be used as hollow glass microspheres.

In the context of this invention, the term polyurethane includes all polyisocyanate polyadducts which are obtainable by reacting the components a) and b) and, if required, c) to e), for example rigid polyurethane foams, flexible polyurethanes, integral polyurethane foams, compact polyurethanes, elastomeric polyurethanes or polyurethaneureas and/or thermoplastic polyurethane.

The following is applicable for the individual components a) to e):

The polyisocyanates a) used include the aliphatic, cycloaliphatic and aromatic isocyanates known from the prior art. Examples are diphenylmethane 4,4'-diisocyanate, the mixtures of monomeric diphenylmethane diisocyanates and more highly nuclear homologs of diphenylmethane diisocyanate (crude MDI or polymer MDI), tetramethylene diisocyanate, tetramethylene diisocyanate trimers, hexamethylene diisocyanate (HDI), phenylene 1,4-diisocyanate, hexamethylene diisocyanate trimers, naphthylene diisocyanate (NDI), isophorone diisocyanate trimers, methylenebis (cyclohexyl) 4,4'-diisocyanate, xylylene diisocyanate, tetramethylxylylene diisocyanate, dodecyl diisocyanate, lysine alkyl ester diisocyanate, alkyl being $C_1$ to $C_{10}$, 2,2,4- or 2,4,4-trimethylhexamethylene 1,6-diisocyanate, 1,4-diisocyanatocyclohexane and polyisocyanates having NCO groups of different reactivities, such as tolylene 2,4-diisocyanate (2,4-TDI), diphenylmethane 2,4'-diisocyanate (2,4'-MDI), triisocyanatotoluene, isophorone diisocyanate (IPDI), methylenebis(cyclohexyl) 2,4'-diisocyanate and 4-methylcyclohexane 1,3-diisocyanate (H-TDI). MDI is preferably used. Mixtures of the abovementioned isocyanates may also be used as polyisocyanates.

Suitable compounds b) having at least two hydrogen atoms reactive toward isocyanate groups are compounds which carry two or more reactive groups selected from OH groups, SH groups, NH groups, $NH_2$ groups and CH-acidic groups, e.g. β-diketo groups, in the molecule.

Those having a functionality of from 2 to 8, preferably from 2 to 6, and a molecular weight of from 300 to 8 000, preferably from 400 to 4 000, are expediently used. For example polyetherpolyamines and/or preferably polyols selected from the group consisting of the polyetherpolyols, polyesterpolyols, polythioetherpolyols, polyesteramides, hydroxyl-containing polyacetals and hydroxyl-containing aliphatic polycarbonates, or mixtures of at least two of said polyols, have proven useful. Polyesterpolyols and/or polyetherpolyols are preferably used. The hydroxyl number of the polyhydroxy compounds is as a rule from 10 to 1 000, preferably from 20 to 300.

All molecular weight data in this patent application have the unit g/mol. With regard to macromolecular substances, the data relate to the number average molecular weight.

In a preferred embodiment, compounds b) are polyetherpolyols. They are prepared by known processes, for example by anionic polymerization with alkali metal hydroxides or alkali metal alcoholates as catalysts or with the aid of double metal cyanide catalysts and with addition of at least one initiator which contains 2 or 3 reactive hydrogen atoms bonded per molecule, from one or more alkylene oxides having 2 to 4 carbon atoms in the alkylene radical. Suitable alkylene oxides are, for example, tetrahydrofuran, ethylene oxide and 1,2-propylene oxide. The alkylene oxides can be used individually, alternately in succession or as mixtures. Mixtures of 1,2-propylene oxide and ethylene oxide are preferred, ethylene oxide preferably being used in amounts of from 10 to 50% as an ethylene oxide end cap (EO cap), so that the resulting polyols have over 70% of primary OH terminal groups.

Suitable initiator molecules are water and dihydric and trihydric alcohols, such as ethylene glycol, 1,2- and 1,3-propanediol, diethylene glycol, dipropylene glycol, 1,4-butanediol, glycerol and/or trimethylolpropane. The polyetherpolyols, preferably polyoxypropylenepolyoxyethylenepolyols, have a functionality of from 2 to 3 and molecular weights of from 1 000 to 8 000, preferably from 2 000 to 7 000.

Other suitable polyetherols are polymer-modified polyetherpolyols, preferably graft polyetherpolyols, in particular those based on styrene and/or acrylonitrile, which are prepared by in situ polymerization of acrylonitrile, styrene and preferably mixtures of styrene and acrylonitrile.

Polyesterpolyols are also suitable. These can be prepared, for example, from organic dicarboxylic acids of 2 to 12 carbon atoms, preferably aliphatic dicarboxylic acids of 4 to 6 carbon atoms, and polyhydric alcohols, preferably diols, of 2 to 12, preferably 2 to 6, carbon atoms. Mixed systems which contain both polyesterols and polyetherols can also be used.

The component b) furthermore comprises conventional chain extenders known from the prior art. These can act both as chain extenders and as crosslinking agents and comprise low molecular weight, polyhydric alcohols, preferably diols and/or triols, having molecular weights of less than 399, preferably from 60 to 300, particularly preferably from 60 to 200. For example, ethylene glycol, propanediol, butanediol, trimethylolethane, glycerol and trimethylolpropane are suitable. Diols and mixtures thereof are preferably used.

Catalysts c) which may be used are conventional compounds which accelerate the reaction of the component a) with the component b). For example, tertiary amines and/or organic metal compounds are suitable. For example, the following compounds may be used as catalysts: triethylenediamine, aminoalkyl- and/or aminophenylimidazoles, e.g. 4-chloro-2,5-dimethyl-1-[2-(N-methylamino)ethyl]imidazole, 2-aminopropyl-4,5-dimethoxy-1-methylimidazole, 1-(3-aminopropyl)-2,4,5-tributylimidazole, 1-aminoethyl-4-hexylimidazole, 1-aminobutyl-2,5-dimethylimidazole, 1-(3-aminopropyl)-2-ethyl-4-methylimidazole, 1-(3-aminopropyl)imidazole and/or 1-(3-aminopropyl)-2-methylimidazole, tin(II) salts of organic carboxylic acids, e.g. tin(II) diacetate, tin(II) dioctanoate, tin(II) diethylhexanoate and tin(II) dilaurate, and dialkyltin(IV) salts of organic carboxylic acids, e.g. dibutyltin diacetate, dibutyltin dilaurate, dibutyltin maleate and dioctyltin diacetate. In general, from 0.01 to 10, preferably from 0.1 to 5, particularly preferably from 0.5 to 4, % by weight, based on the weight of the components a) and b), of catalyst c) are used.

If the preparation of cellular polyisocyanate polyadducts is desired, it is necessary to use blowing agents. A preferably used blowing agent d) is water. Since, owing to the preparation and/or chemical composition, the component b) may comprise water, in some cases no separate addition of water to the reaction mixture is necessary. If water additionally has to be introduced into the polyurethane formulation for achieving the desired density, this water is usually used in amounts of from 0.05 to 4.0, preferably from 0.1 to 3.0, in particular from 0.3 to 2.5, % by weight, based on the weight of the components a) and b) and, if required, c) to e).

Low-boiling liquids which vaporize under the effect of the exothermic polyaddition reaction and advantageously have a boiling point under atmospheric pressure of from −40 to 120° C., preferably from 10 to 90° C., or gases may also be used as blowing agents d), instead of water or, preferably, in combination with water. The liquids of the abovementioned type and gases which are suitable as blowing agents can be selected, for example, from the group consisting of the alkanes, e.g. propane, n-butane, isobutane, n-pentane and isopentane and preferably of the industrial pentane mixtures, cycloalkanes and cycloalkenes, e.g. cyclobutane, cyclopentene, cyclohexene and preferably cyclopentane and/or cyclohexane, and gases, e.g. nitrogen, carbon monoxide and noble gases, such as helium, neon and krypton.

Other suitable blowing agents are salts which undergo thermal decomposition, e.g. ammonium bicarbonate and/or ammonium carbamate.

If required, additives e) may be added in the novel process. Examples of these are surface-active substances, foam stabilizers, cell regulators, external and internal lubricants, fillers and reinforcing materials, for example glass fibers, dyes, pigments, flameproofing agents, hydrolysis stabilizers, antioxidants, abrasion improvers and fungistatic and bacteriostatic substances.

Further information on the starting materials used is to be found, for example, in Kunststoffhandbuch, Volume 7, Polyurethane, edited by Günter Oertel, Carl-Hanser-Verlag, Munich, 3rd Edition, 1993.

For the preparation of the polyurethanes, the polyisocyanates a) are reacted with compounds b) having at least two hydrogen atoms reactive toward isocyanate, and in the presence or absence of components c) to e), in amounts such that the ratio of the number of equivalents of NCO groups of the polyisocyanates a) to the sum of the reactive hydrogen atoms of the components b) is from 1:0.5 to 1:3.50 (corresponding to an isocyanate index of from 50 to 350), preferably from 1:0.65 to 1:1.30, particularly preferably from 1:0.9 to 1:1.15.

The polyurethanes are usually prepared by the known one-shot or the likewise known prepolymer process. In the preferred prepolymer process, a prepolymer, preferably an isocyanate-containing prepolymer, is usually prepared from a) and b) in a first step and is then reacted with further b) to give the desired products.

The starting components are usually mixed and reacted at from 0° C. to 100° C., preferably from 15 to 30° C. The mixing can be effected using the conventional PU processing apparatuses. In a preferred embodiment, the mixing is effected by means of low pressure apparatuses or high pressure apparatuses. After mixing is complete, the mixture is transferred to the mixing pot. In a preferred embodiment, the polyurethane components are injected directly, with mixing, into the mixing pot.

After the components a) and b) and, if required, c) to e), have been reacted, the hollow microspheres are mixed with the polyurethane mixture.

The hollow microspheres are generally added in an amount of from 1 to 80, preferably from 2 to 50, more preferably from 5 to 35, particularly preferably from 10 to 30, % by weight, based on the total weight of the resulting syntactic polyurethanes.

The hollow microspheres are added in a preferably continuously operating mixing apparatus comprising
i) a mixing pot,
ii) a feed line for polyurethane,
iii) a feed line for hollow microspheres,
iv) a stirring element and
v) an outlet orifice, which preferably can be regulated.

Conventional reaction vessels, for example of steel, glass or plastic, e.g. epoxy resin, may serve as mixing pot i). The mixing pot is preferably funnel-shaped, the outlet orifice v) being present at the funnel neck. This funnel is preferably arranged vertically. The size of the mixing pot depends on the scale on which the novel process is to be carried out; in general, the mixing pot can be operated from the micro scale, i.e. for example comprising a volume of a few $cm^3$, to the macro scale, i.e. comprising a volume of up to a few $m^3$.

The feeds ii) and iii) of polyurethane and hollow microspheres lead to the mixing pot. In a preferred embodiment, the feed rates can be regulated separately from one another. The metering of the polyurethane feed can be effected, for example, by a PU metering apparatus, and the metering of the feed of hollow microspheres can be effected, for example, by a screw metering apparatus.

The mixing apparatus is equipped with a stirring element. This stirring element ensures, on the one hand, mixing of the polyurethane with the hollow microspheres and, on the other hand, constant transport of the mixture inside the mixing pot from the feeds to the outlet orifice. In general, conventional stirrers, for example disk stirrers or paddle stirrers, are suitable for this purpose. What is important is that the stirring element is adjusted so that stirring takes place without dead space. Different stirrer sizes and stirrer geometries permit optimum adaptation to the mixing requirements for different viscosities and throughputs.

Furthermore, it is important that the stirring element be adjusted, and be operated at a speed, such that as far as possible no damage to the hollow microspheres occurs. Usually, a stirring speed of from 100 to 5 000 rpm, preferably from 500 to 1 500 rpm, particularly preferably from 700 to 1 000 rpm, is employed.

If, for example, hollow glass microspheres are used, the proportion of damaged hollow glass microspheres after incorporation is in general less than 40, preferably less than 10, more preferably less than 5, particularly preferably less than 2, in particular less than 1, % by weight, based on the total weight of the hollow glass microspheres used. The proportion may vary depending on the density of the hollow spheres used.

The syntactic polyurethane emerges at the outlet orifice v). The outlet orifice can preferably be regulated. In a particularly preferred embodiment, the regulation is effected by means of a conical closure which can be moved in a vertical direction relative to the outlet orifice. By completely lowering the cone, the outlet orifice can be completely closed; by fully raising it, said orifice can be fully opened. In this way, metering of the emerging product is possible. In a preferred embodiment, this conical closure is integrated in the stirring element. Other regulating apparatuses which ensure the desired control effect are however also possible.

By appropriate metering of the feeds and of the product outflow, the average residence time of polyurethane and hollow microspheres in the mixing apparatus can be regulated. In general, this depends on the type of syntactic polyurethane to be prepared and is as a rule from 0.1 to 10, preferably from 1 to 5, minutes.

It is furthermore advantageous to control the reaction and the mixing in such a way that the syntactic polyurethane emerging directly at the outlet orifice has a viscosity of from 1000 to 30 000 mPa.s, the viscosity being determined at room temperature (25° C.) using a rotational viscometer having cone-and-plate geometry.

The continuous recording of the outflow temperature may also serve as a parameter for an optimum residence time in the mixing pot.

An outflow temperature of from 20 to 100° C., preferably from 30 to 80° C., particularly preferably from 40 to 50° C., ensures a sufficient open time (until the material is solid) and prevents an excessively exothermic reaction, which would result in solidification of the syntactic polyurethane in the mixing pot itself and hence in termination of the preparation process.

In this way, control of the process is feasible without considerable technical complexity for a person skilled in the art.

FIG. 1 illustrates a preferred embodiment of the novel process.

In FIG. 1, the meanings are as follows:
1 Vessel for polyol component A and isocyanate component B
2 Mixing head
3 Metering apparatus for hollow microspheres
4 Polyurethane feed
5 Feed of hollow microspheres
6 Mixing pot
7 Stirrer
8 Outlet orifice and conical closure
9 Product outflow
10 Temperature sensor The example which follows illustrates the invention.

EXAMPLE

Preparation of Syntactic Polyurethanes

A polyurethane system (composed of a polyol component comprising a substantially anhydrous polyetherpolyol having an average OH number of 250 and a isocyanate component comprising a polymer MDI having an NCO content of 31%) was introduced into a 5 liter polyethylene mixing pot an an NCO index of 60 via a low-pressure foaming machine (from Elastogran Maschinenbau, type F 20) s a metering unit.

The mixing pot was equipped with a combinagtion of disk stirrers from Vollrath, having a stirrer disk diameter of 65 mm, 90 mm and twice 120 mm.

The initial temperature of the polyurethane system was 25° C. The residence time in the mixing head was established so that a reaction temperature of 50° C. was not exceeded at the outlet orifice. The throughput of the polyurethane system was brought to 75 grams/second. The discharge rate from the mixing head was regulated by a conical closure.

Hollow glass microspheres having a diameter of on average 40 μm (Scotchlite® Glass Bubbles) were added to the mixing pot by means of a screw conveyor. The throughput of hollow glass microspheres was 28.1 grams/second. The viscosity of the resulting syntactic polyurethane at the outlet orifice was from 6 000 to 8 000 mPas.

The total throughput of polyurethane and hollow glass microspheres was 103.1 grams/second.

The syntactic polyurethanes obtained have a high proportion of hollow microspheres, these being extremely homogeneously distributed in the polyurethane matrix. The proportion of broken glass spheres was negligibly small.

The example shows that the novel process makes it possible, using apparatus which is not very complex, advantageously to incorporate a high concentration of hollow microspheres, without losses through breakage, into a premixed polyurethane matrix.

We claim:

1. A process for the preparation of a syntactic polyurethane by mixing hollow microspheres with a polyurethane preparable by reacting
   a) a polyisocyanate with
   b) a compound which has at least two hydrogen atoms reactive toward isocyanate, in the presence or absence of
   c) a catalyst,
   d) a blowing agent and
   e) an additive,
   which process comprises
in a first step, reacting the components a) and b) and, if required, c) to d) to obtain a polyurethane mixture, and in a second step, mixing the polyurethane mixture with the hollow microspheres in a mixing apparatus which is free of dead space and which comprises
   i) a mixing pot,
   ii) a feed for polyurethane,
   iii) a feed for hollow microspheres,
   iv) a stirring element and
   v) a regulatable outlet orifice,
to obtain the syntactic polyurethane, and wherein the syntactic polyurethane has a viscosity of from 1 000 to 30 000 mPa·s at the outlet orifice.

2. A process as claimed in claim 1, wherein the mixing of the components a) and b) and, if required, c) to d) is effected in a high-pressure or low-pressure mixing head.

3. A process as claimed in claim 1, wherein the mixing pot i) comprises a funnel-like design, the outlet orifice
   v) being present in the neck of the funnel.

4. A process as claimed in any of claims 1 to 3, wherein the size of the outlet orifice is regulated by a conical closure which is movable in a vertical direction relative to the outlet orifice.

5. A process as claimed in claim 1, wherein the syntactic polyurethane has a content of hollow microspheres of from 1 to 80% by weight, based on the total weight of the syntactic polyurethane.

6. A process as claimed in claim 1, wherein the average residence time of the mixture of polyurethane and hollow microspheres in the mixing pot i) is from 0.1 to 10 minutes.

* * * * *